United States Patent
Zhu et al.

(10) Patent No.: US 9,835,807 B2
(45) Date of Patent: Dec. 5, 2017

(54) OPTICAL FIBER CONNECTOR

(71) Applicants: Amphenol Fiber Optic Technology (Shenzhen) Co., Ltd., Shenzhen, Guangdong Province (CN); Gloriole Electroptic Technology Corp., Kaohsiung (TW)

(72) Inventors: Ling-Hua Zhu, Shenzhen (CN); Song-Sheng Li, Shenzhen (CN); Xue-Wu Lei, Shenzhen (CN); Bo-Lin Jiang, Shenzhen (CN)

(73) Assignees: AMPHENOL FIBER OPTIC TECHNOLOGY (SHENZHEN) CO., LTD., Shenzhen, Guangdong Province (CN); GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 0 days.

(21) Appl. No.: 15/179,073

(22) Filed: Jun. 10, 2016

(65) Prior Publication Data

US 2017/0153394 A1    Jun. 1, 2017

(30) Foreign Application Priority Data

Nov. 30, 2015 (TW) .............................. 104219182 U

(51) Int. Cl.
*G02B 6/38* (2006.01)

(52) U.S. Cl.
CPC ........... *G02B 6/387* (2013.01); *G02B 6/3825* (2013.01); *G02B 6/3887* (2013.01)

(58) Field of Classification Search
None
See application file for complete search history.

(56) References Cited

U.S. PATENT DOCUMENTS

| 7,567,741 B2 * | 7/2009 | Abernathy | G02B 6/381 |
| | | | 385/100 |
| 7,654,747 B2 | 2/2010 | Theuerkorn et al. | |

* cited by examiner

*Primary Examiner* — Chad H Smith
(74) *Attorney, Agent, or Firm* — Muncy, Geissler, Olds & Lowe, P.C.

(57) ABSTRACT

An optical fiber connector for connecting to an optical fiber cable includes a shell, a hollow guiding device, and a socket device. The hollow guiding device is connected to the shell. The socket device includes a hollow socket unit and a ferrule. The socket unit is formed as one piece and is detachably connected to an end of the guiding device opposite to the shell such that the optical fiber cable extends through the guiding device and the shell into the socket unit. The ferrule is disposed in the socket unit and is for connecting to one end of the optical fiber cable.

5 Claims, 5 Drawing Sheets

OPTICAL FIBER CONNECTOR

CROSS-REFERENCE TO RELATED APPLICATION

This application claims priority of Taiwanese Patent Application No. 104219182, filed on Nov. 30, 2015.

FIELD

The disclosure relates to a connector, more particularly to an optical fiber connector.

BACKGROUND

Referring to FIG. 1, a conventional fiber optic receptacle and plug assembly 1 disclosed in U.S. Pat. No. 7,654,747 is for connecting to an optical fiber cable. The conventional fiber optic receptacle and plug assembly 1 includes a plug unit 11, an alignment sleeve 12 connected to an end of the plug unit 11, a tubular outer housing 13 surrounding the alignment sleeve 12 and part of the plug unit 11, a crimp band 14 disposed outside of the outer housing 13 and surrounding the plug unit 11, a coupling nut 15 sleeved on the outer housing 13, and a protective cap 16 capping an end of the outer housing 13 which is adjacent to the alignment sleeve 12 and engaging the coupling nut 15.

The plug unit 11 includes a crimp insert 111 that extends out of the outer housing 13, an inner housing 112 that is disposed between the crimp insert 111 and the alignment sleeve 12 and that engages the crimp insert 111, a ferrule 113 that is disposed in and partially extends out of the inner housing 112 and that is for connecting to an end of the optical fiber cable, a ferrule boot 114 that is partially inserted into the ferrule 113, a spring centering cuff 115 that is sleeved on the ferrule boot 114, and a round spring 116 that has two ends respectively abutting against the spring centering cuff 115 and the crimp insert 111.

Since the conventional fiber optic receptacle and plug assembly 1 is composed of a plurality of individual components, the assembly process is relatively complicated. Moreover, since the plug unit 11 and the alignment sleeve 12 are separate components, liquid may permeate into the inner housing 112 and may contact the optical fiber cable through a gap between the plug unit 11 and the alignment sleeve 12. As a result, the optical fiber cable may not function properly, thereby undesirably reducing the service life of the optical fiber cable.

SUMMARY

Therefore, an object of the disclosure is to provide an optical fiber connector that can alleviate at least one of the drawbacks of the prior art.

According to the disclosure, the optical fiber connector is to be connected to an optical fiber cable. The optical fiber connector includes a shell, a hollow guiding device, and a socket device. The hollow guiding device is connected to the shell. The socket device includes a hollow socket unit and a ferrule. The socket unit is formed as one piece and is detachably connected to an end of the guiding device opposite to the shell such that the optical fiber cable extends through the guiding device and the shell into the socket unit. The ferrule is to be connected to one end of the optical fiber cable and is disposed in the socket unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
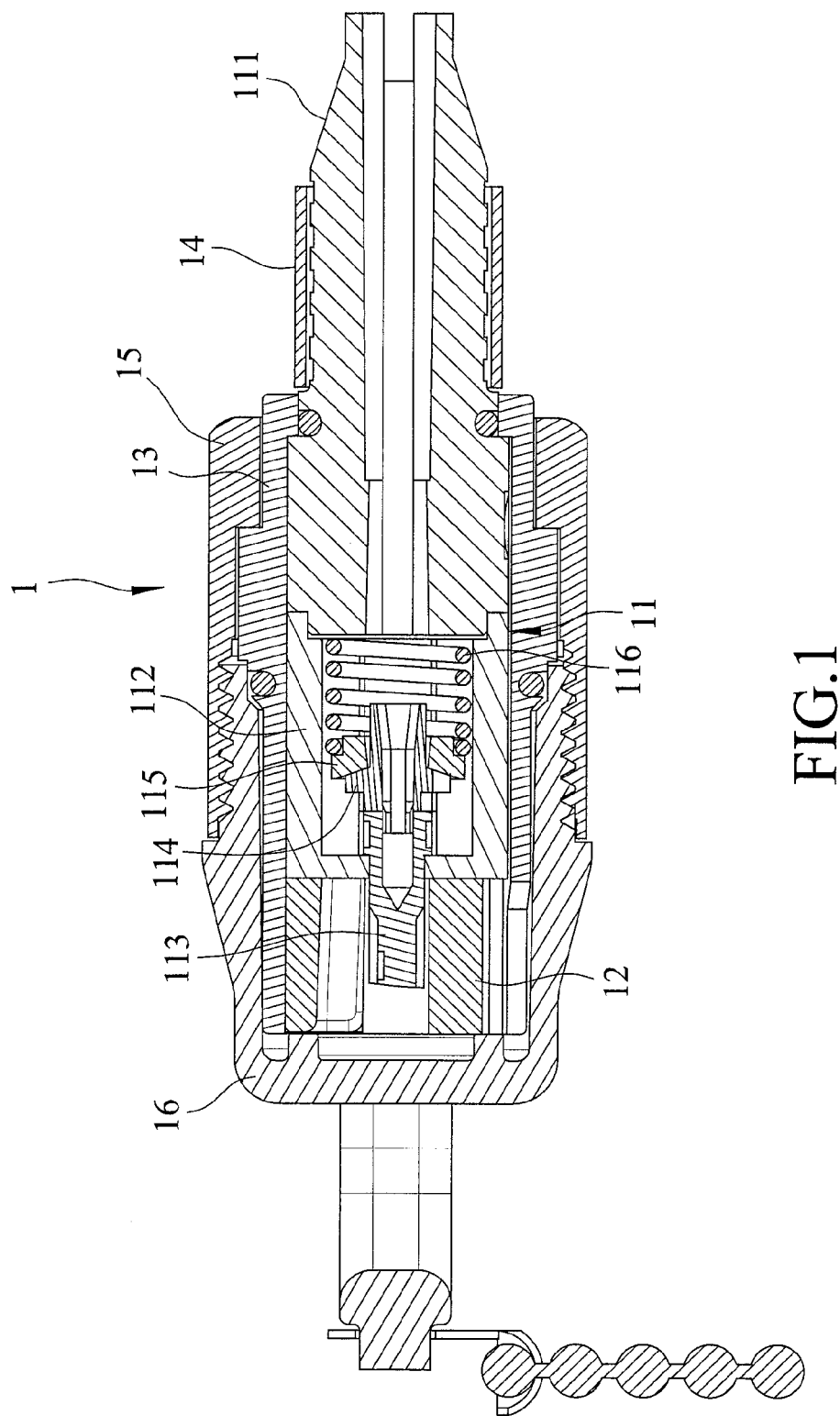
FIG. 1 is a sectional view of a conventional fiber optic receptacle and plug assembly disclosed in U.S. Pat. No. 7,654,747.
Figure 2:
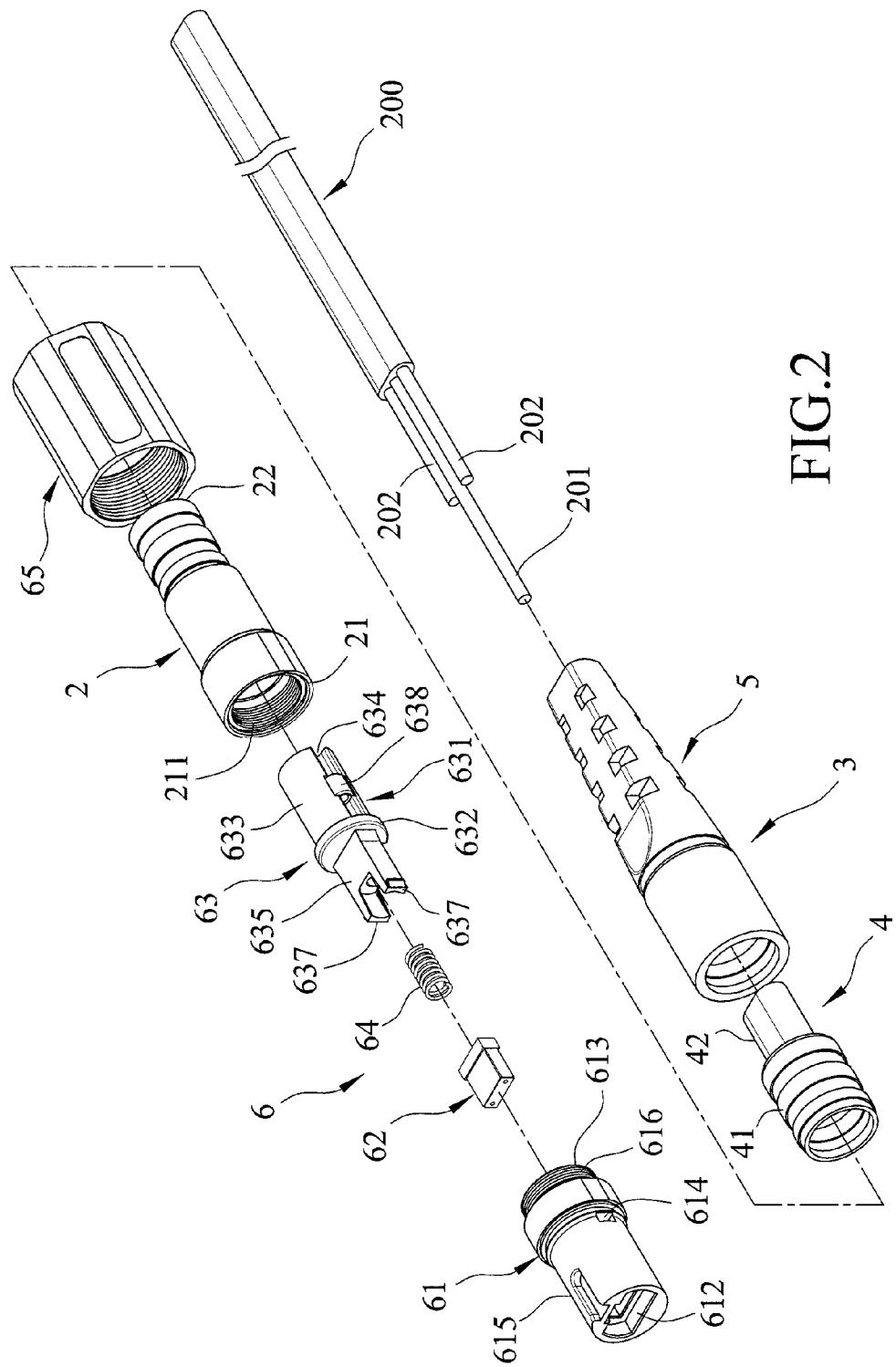
FIG. 2 is an exploded perspective view illustrating an embodiment of an optical fiber connector according to the disclosure and an optical fiber cable.
Figure 3:
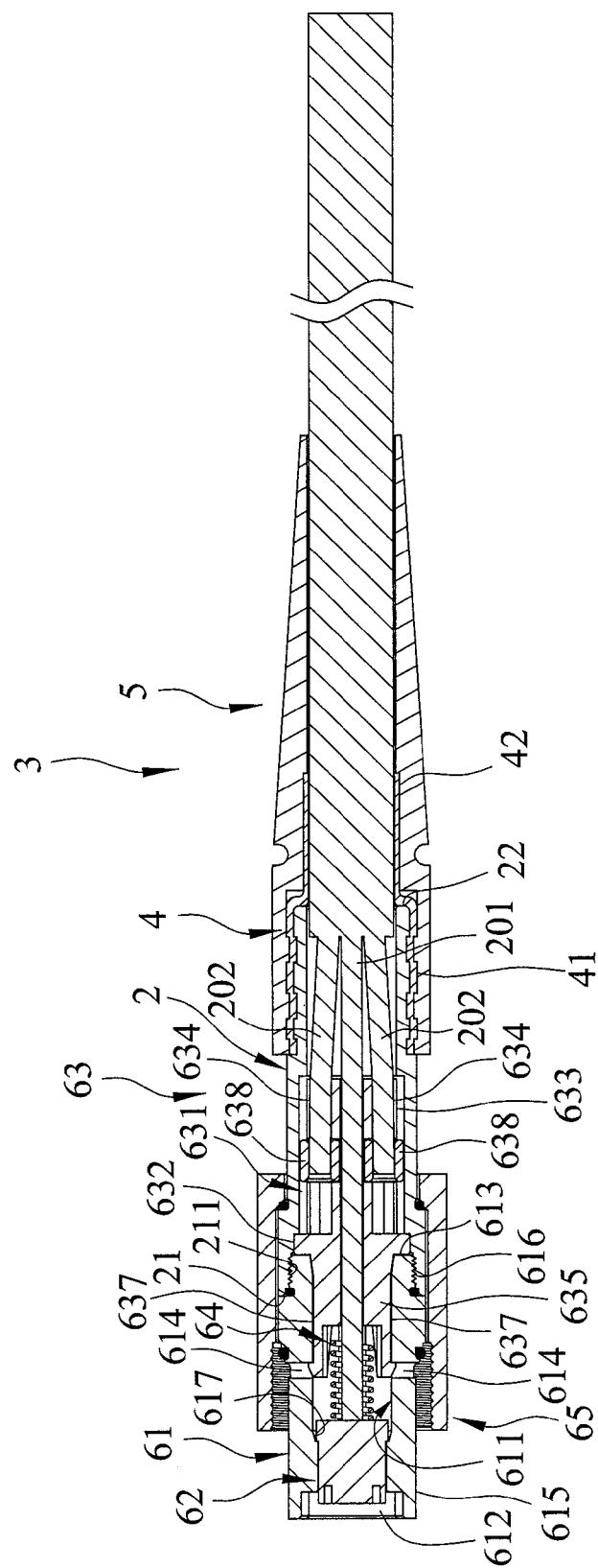
FIG. 3 is a fragmentary sectional view illustrating the embodiment that is connected to the optical fiber cable.
Figure 4:
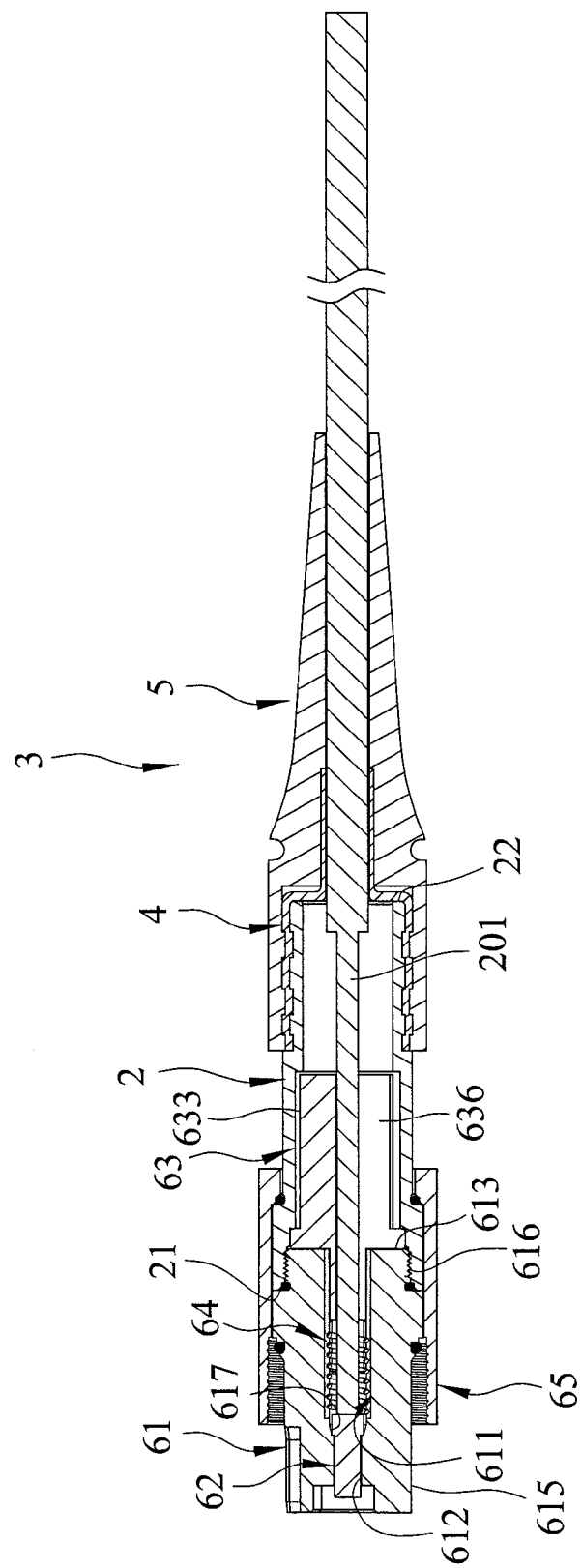
FIG. 4 is another fragmentary sectional view illustrating the embodiment that is connected to the optical fiber cable.

Referring to FIGS. 2 to 4, an embodiment of an optical fiber connector according to the disclosure is for connecting to an optical fiber cable 200. The optical fiber cable 200 includes an optical fiber core 201, and two strengthening cores 202 respectively disposed on two lateral sides of the optical fiber core 201. The optical fiber connector includes a shell 2, a hollow guiding device 3, and a socket device 6.

The shell 2 is tubular, and has opposite front and rear open ends 21, 22 for extension of the optical fiber cable 200 therethrough, and an internal thread 211 that is formed on the front open end 21.

The hollow guiding device 3 is connected to the rear open end 22 of the shell 2, and includes a guiding barrel 4 and a tail cover 5. The guiding barrel 4 has a coupling segment 41 that surrounds and is connected to the rear open end 22 of the shell 2, and a guiding segment 42 that extends from the coupling segment 41, and that is for surrounding and being connected to the optical fiber cable 200. The tail cover 5 surrounds and is coupled to the guiding barrel 4.

The socket device 6 includes a hollow socket unit 61, a ferrule 62, a strengthening unit 63, a resilient member 64, and a linking unit 65.

The hollow socket unit 61 is formed as one piece, and is detachably connected to the front open end 21 of the shell 2 such that the optical fiber cable 200 extends through the shell 2 and the guiding device 3 into the socket unit 61. The socket unit 61 has an inner surrounding wall 611, an outer surrounding wall 615 surrounding the inner surrounding wall 611, and an external thread 616. The inner surrounding wall 611 defines a socket open end 612, and a connecting open end 613 opposite to the socket open end 612 and proximate to the shell 2. The inner surrounding wall 611 has an internal shoulder part 617 formed between the socket open end 612 and the connecting open end 613, and two spaced-apart engaging grooves 614 that extend to the outer surrounding wall 615. The external thread 616 is formed on the outer surrounding wall 615, and engages threadedly the internal thread 211 of the shell 2.

The ferrule 62 is disposed in the socket unit 61 and is to be connected to one end of the optical fiber cable 200. The ferrule 62 abuts against the internal shoulder part 617 of the inner surrounding wall 611, and has a portion that extends outwardly of the socket open end 612.

The strengthening unit 63 is disposed in the shell 2, is connected to the socket unit 61, and is to be connected to the strengthening cores 202 of the optical fiber cable 200. The strengthening unit 63 includes a strengthening mechanism 631 and two strengthening rings 638.

The strengthening mechanism 631 has a base body 632, a connecting member 633, a coupling seat 635, a through hole 636, and two engaging hooks 637. The base body 632 abuts against the connecting open end 613 of the socket unit 61. The connecting member 633 extends from the base body 632, is disposed in the shell 2, and is formed with a plurality of spaced-apart locking grooves 634 extending parallel to the through hole 636. The coupling seat 635 extends from the base body 632 into the socket unit 61. The through hole 636 extends through the connecting member 633, the base body 632, and the coupling seat 635, and is for extension of the optical fiber core 201 of the optical fiber cable 200 therethrough. The engaging hooks 637 are spaced apart from each other, extend from the coupling seat 635 toward the socket opening, and respectively engage the engaging grooves 614 of the hollow socket unit 61. In this embodiment, the connecting member 633, the base body 632, and the coupling seat 635 are formed as one piece.

The strengthening rings 638 are respectively disposed in the locking grooves 634, and are respectively for extension of the strengthening cores 202 of the optical fiber cable 200 therethrough.

The resilient member 64 has two ends that respectively abut against the coupling seat 635 of the strengthening unit 63 and the ferrule 62. The resilient member 64 is to be sleeved on the optical fiber cable 200. More specifically, the optical fiber core 201 of the optical fiber cable 200 extends through the through hole 636 and the resilient member 64, and is connected to the ferrule 62. In this embodiment, the resilient member 64 is a spring.

Figure 5:
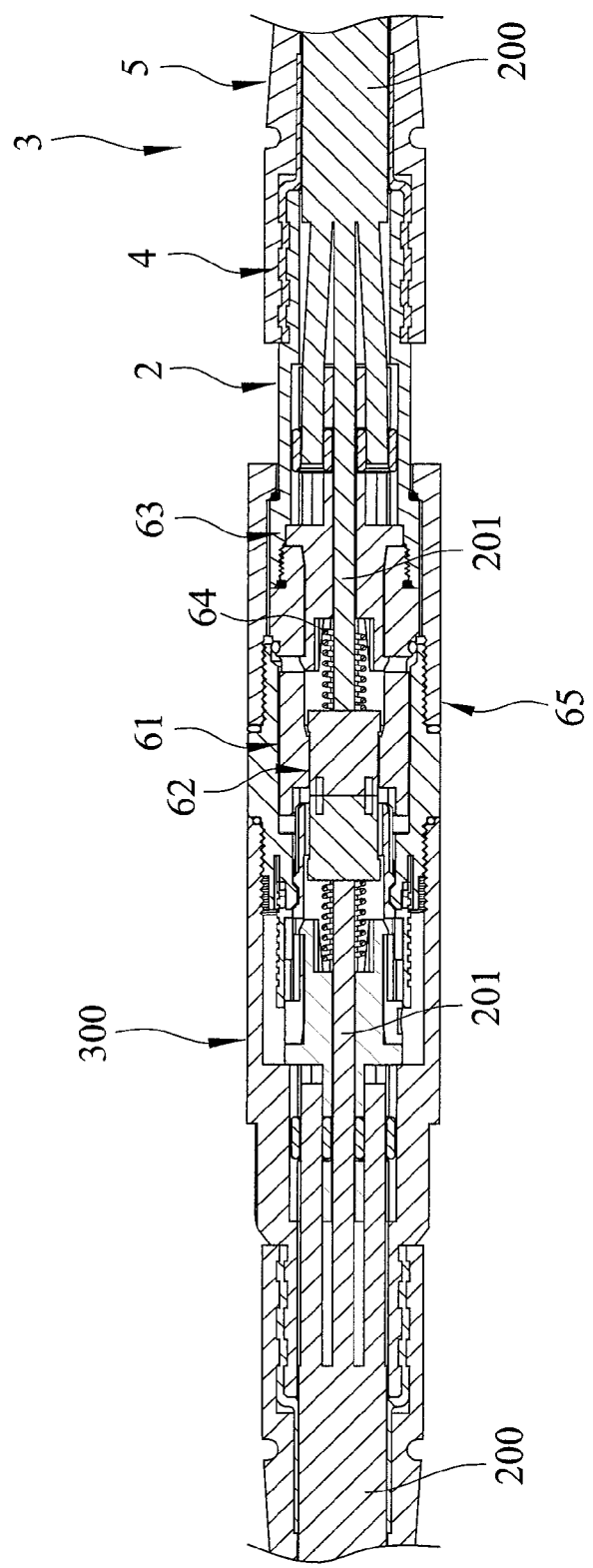
FIG. 5 is a fragmentary sectional view illustrating that the embodiment is connected to the optical fiber cable and is coupled to an optical fiber adapter.

Referring to FIGS. 4 and 5, the linking unit 65 covers a junction between the shell 2 and the socket unit 61. When in use, the linking unit 65 is coupled to an optical fiber adapter 300. Such design increases the durability of the optical fiber connector, and ensures a proper end-to-end physical contact between the two optical fiber cores 201 of the optical fiber cables 200 of the optical fiber connector and the optical fiber adapter 300 shown in FIG. 5.

By virtue of the configuration of the hollow socket unit 61 and the strengthening mechanism 631, the assembly process of the optical fiber connector is less complicated comparing with that of the above-mentioned conventional fiber optic receptacle and plug assembly 1. Therefore, the assembly time and the assembly cost are reduced. Moreover, the strengthening rings 638 respectively and securely hold the strengthening cores 202 in place, thereby reducing the possibility of the optical fiber core 201 being disconnected from the ferrule 62 due to a tensile force applied to the optical fiber cable 200 in a direction away from the socket unit 61. In addition, since each of the socket unit 61 and the strengthening mechanism 631 is formed as one piece, and the linking unit 65 covers a junction between the socket unit 61 and the shell 2, liquid is less likely to permeate into the optical fiber connector, thereby increasing the service life of the optical fiber cable 200.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector adapted to be connected to an optical fiber cable, the optical fiber cable including an optical fiber core, and two strengthening cores respectively disposed on two lateral sides of the optical fiber core, said optical fiber connector comprising:
   a shell;
   a hollow guiding device connected to said shell; and
   a socket device including a hollow socket unit that is formed as one piece and that is detachably connected to an end of said shell opposite to said guiding device such that the optical fiber cable extends through said guiding device and said shell into said socket unit, and a ferrule that is adapted to be connected to one end of the optical fiber cable and that is disposed in said socket unit,
   wherein said socket device further includes:
   a strengthening unit disposed in said shell, connected to said socket unit, and adapted to be connected to the optical fiber cable, and
   a resilient member having two ends that respectively abut against said strengthening unit and said ferrule;
   wherein said socket unit has an inner surrounding wall that defines a socket open end and a connecting open end opposite to said socket open end, and that has an internal shoulder part formed between said socket open end and said connecting open end, said ferrule abutting against said internal shoulder part of said inner surrounding wall and having a portion that extends outwardly of said socket open end;
   wherein said strengthening unit includes a strengthening mechanism having a base body that abuts against said connecting open end of said socket unit, a connecting member that extends from said base body and that is disposed in said shell, a coupling seat that extends from said base body into said socket unit, and a through hole that extends through said connecting member, said base body and said coupling seat and that is adapted for extension of the optical fiber cable therethrough;
   wherein said connecting member, said base body and said coupling seat are formed as one piece;
   wherein said resilient member is adapted to be sleeved on the optical fiber cable, said two ends of said resilient member respectively abut against said coupling seat and said ferrule;
   wherein said strengthening mechanism further has two engaging hooks spaced apart from each other and extending from said coupling seat toward said socket open end;
   wherein said inner surrounding wall of said socket unit further has two engaging grooves respectively engaged with said engaging hooks;

wherein said connecting member of said strengthening mechanism is formed with a plurality of spaced-apart locking grooves extending parallel to said through hole; and wherein said strengthening unit further has a plurality of strengthening rings respectively disposed in said locking grooves, each of said strengthening rings surrounding a respective one of the strengthening cores of the optical fiber cable.

2. The optical fiber connector as claimed in claim 1, wherein:

said socket unit further has an outer surrounding wall surrounding said inner surrounding wall, and an external thread formed on said outer surrounding wall; and said shell has opposite front and rear open ends adapted for extension of the optical fiber cable therethrough, and an internal thread that is formed on said front open end and that engages threadedly said external thread of said socket unit.

3. The optical fiber connector as claimed in claim 1, wherein:

said shell has opposite front and rear open ends adapted for extension of the optical fiber cable therethrough; and said guiding device includes a guiding barrel having a coupling segment that surrounds and is connected to said rear open end of said shell, and a guiding segment that extends from said coupling segment, and that is adapted to surround and to be connected to the optical fiber cable, and a tail cover surrounding and being coupled to said guiding barrel.

4. The optical fiber connector as claimed in claim 1, wherein said socket device further includes a linking unit covering a junction between said shell and said socket unit and adapted to be coupled to an optical fiber adapter.

5. The optical fiber connector as claimed in claim 1, wherein:

said through hole of said strengthening mechanism is adapted for extension of the optical fiber core of the optical fiber cable therethrough.

* * * * *